(12) United States Patent
Blanchard et al.

(10) Patent No.: US 8,888,053 B2
(45) Date of Patent: Nov. 18, 2014

(54) AIRCRAFT CONDUIT HARNESS RETENTION SYSTEM

(75) Inventors: Jack Blanchard, Bristol (GB); David Routledge, Bristol (GB)

(73) Assignee: Airbus Operations Limited, Bristol (GB)

(*) Notice: Subject to any disclaimer, the term of this patent is extended or adjusted under 35 U.S.C. 154(b) by 96 days.

(21) Appl. No.: 13/159,530

(22) Filed: Jun. 14, 2011

(65) Prior Publication Data

US 2011/0303799 A1 Dec. 15, 2011

(30) Foreign Application Priority Data

Jun. 15, 2010 (GB) .................................... 1009965.3

(51) Int. Cl.
| | | |
|---|---|---|
| F16L 3/00 | (2006.01) | |
| H02G 3/32 | (2006.01) | |
| F16L 3/22 | (2006.01) | |
| F16L 3/237 | (2006.01) | |
| B64C 1/40 | (2006.01) | |

(52) U.S. Cl.
CPC . H02G 3/32 (2013.01); *F16L 3/237* (2013.01); B64C 1/406 (2013.01); F16L 3/221 (2013.01)
USPC .......................................... 248/68.1; 248/74.1

(58) Field of Classification Search
CPC ............... F16L 3/00; F16L 3/22; F16L 3/221; H02G 3/32; B64C 1/406
USPC .............. 248/62, 63, 65, 68.1, 73, 74.1, 74.3, 248/74.4; 403/174, 194; 411/384; 24/20 R
See application file for complete search history.

(56) References Cited

U.S. PATENT DOCUMENTS

| | | | | |
|---|---|---|---|---|
| 2,407,217 | A * | 9/1946 | Banneyer | 248/68.1 |
| 3,552,696 | A * | 1/1971 | Orenick et al. | 248/74.3 |
| 3,563,131 | A * | 2/1971 | Ridley, Sr. | 411/384 |
| 4,145,977 | A * | 3/1979 | Yellin | 403/174 |
| 4,601,447 | A * | 7/1986 | McFarland | 248/49 |
| 4,618,114 | A * | 10/1986 | McFarland | 248/65 |
| 4,708,306 | A * | 11/1987 | Mitomi | 248/74.3 |
| 5,056,953 | A * | 10/1991 | Marot et al. | 403/194 |
| 5,271,588 | A * | 12/1993 | Doyle | 248/68.1 |
| 5,564,672 | A | 10/1996 | Matson | |
| 5,612,509 | A | 3/1997 | Market | |
| 6,443,403 | B1 * | 9/2002 | Page et al. | 248/71 |
| 6,663,054 | B2 * | 12/2003 | Robicheau et al. | 248/58 |

(Continued)

FOREIGN PATENT DOCUMENTS

| | | |
|---|---|---|
| DE | 19820651 A1 | 11/1999 |
| EP | 1 503 091 A2 | 2/2005 |

(Continued)

OTHER PUBLICATIONS

British Search Report for GB 1009965.3 dated Oct. 7, 2010.
European Search Report for EP Application No. 11169663, dated Mar. 20, 2014.

*Primary Examiner* — Tan Le
(74) *Attorney, Agent, or Firm* — Lowe Hauptman & Ham, LLP

(57) ABSTRACT

A conduit harness retention system has a base, a first spacer, a second spacer and a cap which snap-fit together to retain P-clip harnesses in position spaced from an aircraft fuselage.

3 Claims, 3 Drawing Sheets

(56) References Cited

U.S. PATENT DOCUMENTS

| | | | |
|---|---|---|---|
| 7,478,783 B2 * | 1/2009 | Royer | 248/74.1 |
| 2005/0121560 A1 * | 6/2005 | Slyter | 248/71 |
| 2011/0303799 A1 * | 12/2011 | Blanchard et al. | 248/65 |
| 2012/0112016 A1 * | 5/2012 | Blanchard et al. | 248/74.2 |

FOREIGN PATENT DOCUMENTS

| | | |
|---|---|---|
| GB | 875935 A | 8/1961 |
| WO | 02/095956 A2 | 11/2002 |
| WO | 03/041541 A2 | 5/2003 |

* cited by examiner

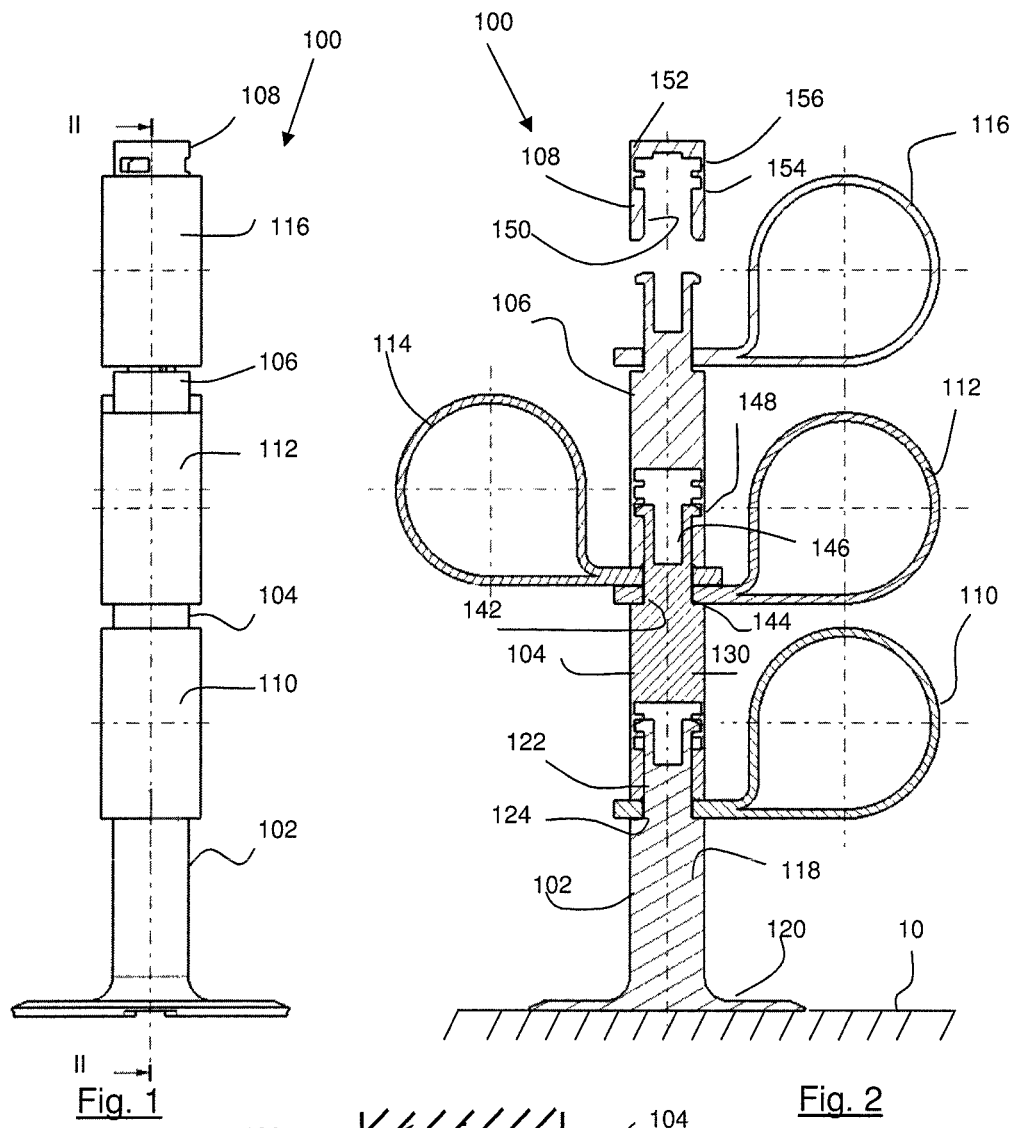
Fig. 1
Fig. 2
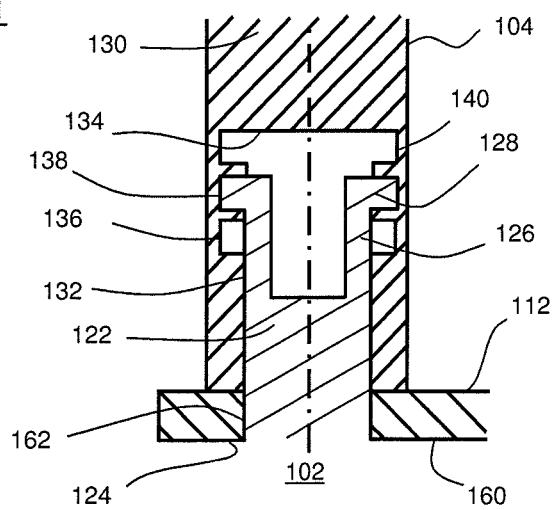
Fig. 3

AIRCRAFT CONDUIT HARNESS RETENTION SYSTEM

RELATED APPLICATIONS

The present application is based on, and claims priority from, British Application Number 1009965.3, filed Jun. 15, 2010, the disclosure of which is hereby incorporated by reference herein in its entirety.

The present invention relates to an aircraft conduit harness retention system. More particularly, the present invention relates to a snap-fit aircraft conduit harness retention system which permits multiple conduit harnesses to be mounted from a single mounting location.

Wire looms in aircraft are commonly harnessed using P-clip harnesses. Such clips are constructed from strips of metal or plastics material formed in a loop to provide a wire loom receiving portion and a connection portion comprising a flat double-thickness flange. The flange will typically define a bore for the attachment of the P-clip harness to a component within the aircraft.

Because of their shape, it is only possible to anchor a maximum of two P-clips together at a single point, with the flanges overlapping and the loops facing in opposite directions. This is a problem because if more than two wire looms are to be attached to the aircraft, several anchoring points need to be selected which increases both part count and the need to bore into, and hence weaken, aircraft components more frequently.

It is often desirable to attach other types of conduits to aircraft structures such as hydraulic, pneumatic, coolant or fuel lines.

It is an object of the invention to provide an improved aircraft conduit harness retention system.

According to the present invention there is provided an aircraft conduit harness retention system comprising a first part having an attachment portion for attachment to an aircraft component at a first end and a first mating formation at a second end, a second part having a second mating formation, wherein the first mating formation and the second mating formation are engageable via a snap-fit to retain a flange of a first conduit harness therebetween such that the conduit harness is offset from the aircraft component.

According to a second aspect of the invention, there is provided an aircraft conduit harness retention system comprising a first part having an attachment portion for attachment to an aircraft component at a first end and a first mating formation at a second end, wherein the first mating formation is a snap-fit formation for attachment of a conduit harness.

By providing such an arrangement, conduit harnesses such as P-clips can be offset such that more than two can be mounted to a single position on an aircraft component such as a fuselage, wing or empennage.

An example aircraft conduit harness retention system will now be described with reference to the accompanying figures in which:

FIG. 1 is a front view of a conduit harness retention system in accordance with the present invention.

FIG. 2 is a side section view of the conduit harness retention system of FIG. 1 along II-II, FIG. 3 is a close-up view of a part of the conduit harness retention system of FIG. 1.

Figure 4:
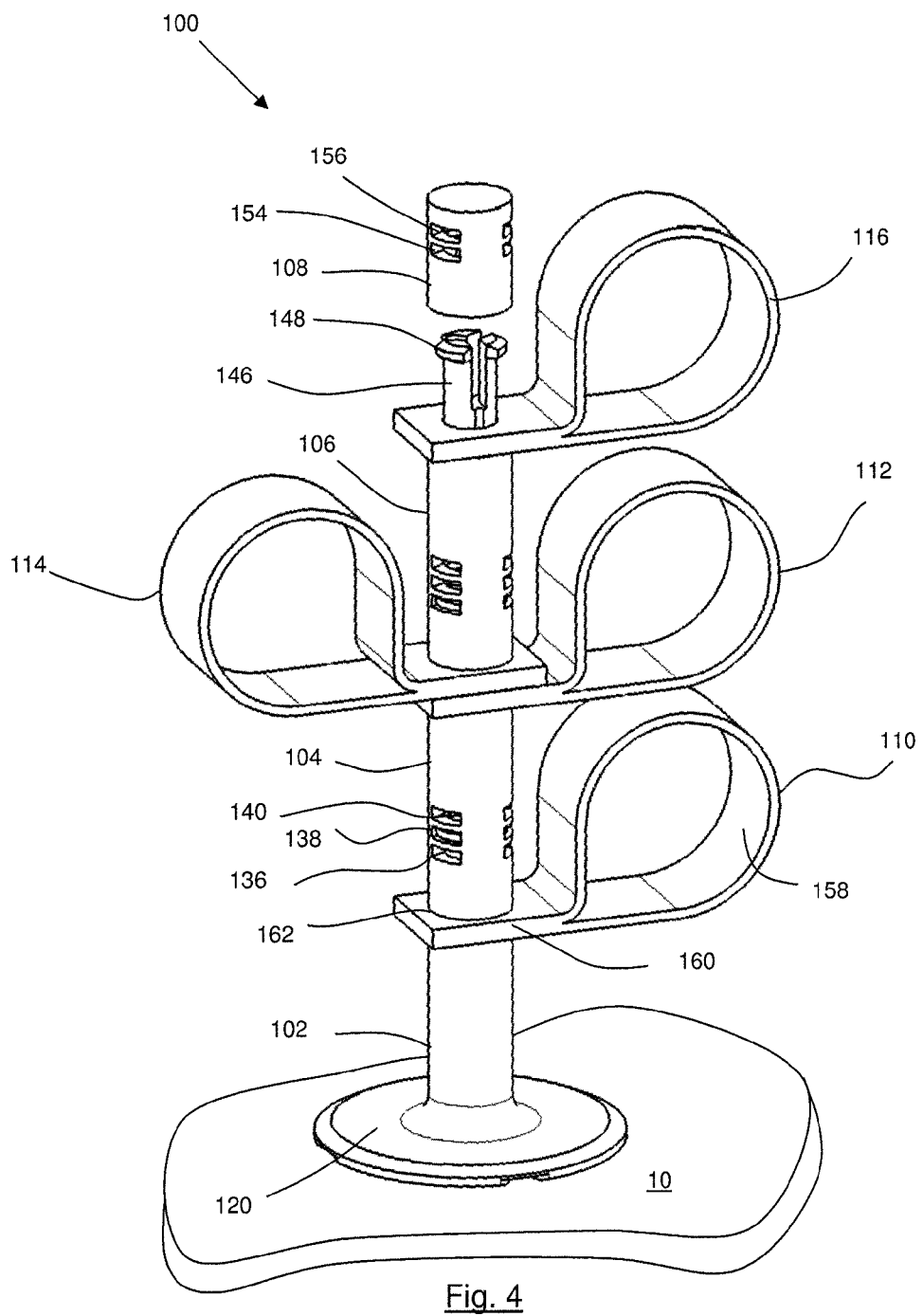
FIG. 4 is a perspective view of the harness retention system of FIG. 1, and, FIG. 5 shows alternative arrangements of the harness retention system of FIG. 1.

A conduit harness retention system 100 is provided which comprises a base 102, a first spacer 104, a second spacer 106 and a cap 108. The harness retention system retains a first P-clip harness 110, a second P-clip harness 112, a third P-clip harness 114 and a fourth P-clip harness 116 as will be described below.

The base 102 comprises a first cylindrical portion 118 which terminates at a first end in a circular flange 120. The flange can be adhered to an aircraft fuselage (or other component) 10. The base 102 comprises a second cylindrical portion 122 at a second end, of a smaller diameter than the first cylindrical portion 118 to form a shoulder 124. The second cylindrical portion 122 terminates in a pair of axially extending flexible fingers 126, each of which comprise a radially outwardly extending tab 128.

The first spacer 104 comprises a first cylindrical portion 130 which, at a first end, defines a blind bore 132 terminating at an end wall 134. The bore extends radially into a first diametrically opposed pair of slots 136, a second diametrically opposed pair of slots 138 and a third diametrically opposed pair of slots 140.

The first spacer 104 is formed substantially identically to the base 102 at a second end, defining a second cylindrical portion 142, a shoulder 144, a pair of axially extending flexible fingers 146 terminating in tabs 148.

The second spacer 106 is substantially identical to the first spacer 104.

The cap 108 is generally cylindrical and comprises a formation similar to the first end of the first spacer 104, having a blind bore 150 terminating in an end wall 152. The bore 152 only has two pairs of diametrically opposed slots 154, 156.

Each P-clip harness 110, 112, 114, 116 comprises a strip of plastics material defining a loop 158 and a flange 160 projecting tangentially therefrom. The flange 160 defines a bore 162 therethrough.

In use, the base 102 is attached to the aircraft fuselage 10 by adhesive. The first P-clip harness 110 is passed over the base 102 such that the bore 162 surrounds the second cylindrical portion 122 and abuts the shoulder 124. The first spacer 104 is then mated with the base 102 such that the fingers 126 enter the blind bore 132. Because of the tabs 128, the fingers deform radially inwardly until the tabs snap into the first slots 136 at which point the fingers 126 resile outwardly. In order to secure the P-clip harness 110 firmly, the first spacer 104 is pushed down further such that the fingers 126 deform inwardly again and the tabs 128 snap into the second slots 138. At this point a groove is formed proximate the shoulder 124 equal in width to the width of the flange 160. The first P-clip 110 harness is therefore secure.

The second and third P-clip harnesses 112, 114 are passed over the second cylindrical portion 142 of the first spacer 104. The P-clip harnesses 112, 114 are diametrically opposed. The second spacer 106 is then placed over the P-clip harnesses 112, 114 to secure them in position. It will be noted that the tabs 148 engage the lower slots of the second spacer 106 only because the combined thickness of the flanges of the second and third P-clip harnesses 112, 114 is higher than a single P-clip harnesses. Therefore a larger groove proximate the shoulder 144 is required.

Finally, the fourth P-clip harness 116 is placed over the upper end of the second spacer 106 and the end cap used to secure it in place.

Figure 5:
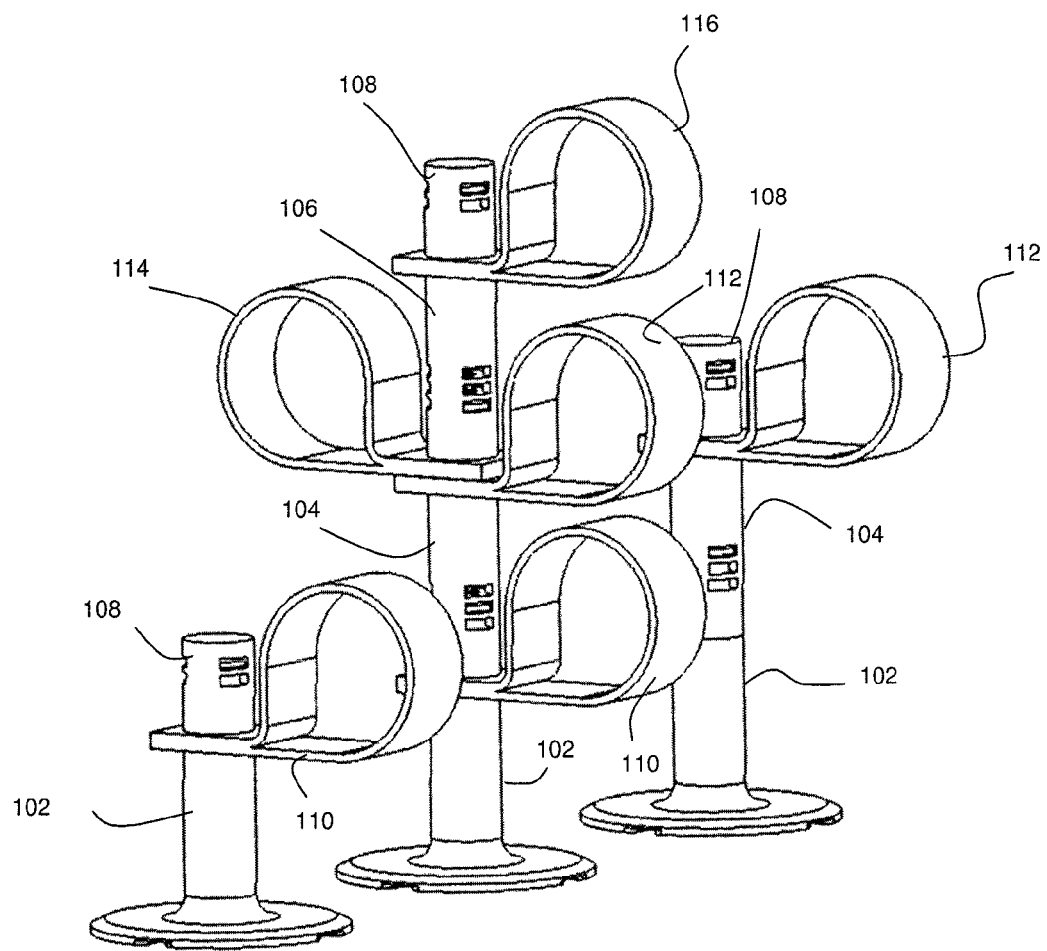

It will be noted that the first and second spacers 104, 106 have three sets of slots. The third slots 140 are used in the event that no P-clip harness will be inserted between the spacer and the base or spacer below, as shown in FIG. 5 in which the second P-clip harness 112 is mounted alone.

Variations of the above embodiment may fall within the scope of the present invention.

For example, a further pair of opposing slots may be provided on each spacer as a failsafe position, should the tabs 148 become dislodged from the lowest pair of slots.

Other types of harnesses or clips may be used; the invention is not limited to P-clip harnesses. The system may be used to retain harnesses suitable for other types of conduits; e.g. fuel, pneumatic, hydraulic or coolant.

The snap-fit formations may be designed such that they cannot be disassembled without breaking them. This ensures that the components may only be used once.

The base may be arranged with a snap-fit formation on an upper end thereof to engage the bore of a p-clip without the use of a cap. Such a snap-fit formation preferably comprises radially outwardly biased fingers to hook over the periphery of the p-clip bore.

The invention claimed is:

1. An aircraft conduit harness retention system comprising:
a first part having an attachment formation for attachment to an aircraft component at a first end and a first mating formation at a second end;
a second part having a second mating formation; and
a conduit harness separate from the second part, wherein said conduit harness includes a wire loom receiving portion and a flange connected to the wire loom receiving formation, the flange having a bore defined therethrough,
wherein the bore of the flange is engaged by one of the first mating formation and second mating formation and the first mating formation and the second mating formation are engaged via a snap-fit to secure the flange of the conduit harness between the first and second parts such that the conduit harness is offset from the aircraft component, wherein the the second part has a third mating formation defined at an end opposite the second mating formation, the third formation engageable with a further second mating formation of a further mount cap to retain a flange of a conduit harness therebetween.

2. An aircraft conduit harness retention system comprising:
a first having an attachment formation for attachment to an aircraft component at a first end and a first mating formation at a second end;
a second part having a second mating formation; and
a conduit harness separate from the second part, wherein said conduit harness includes a wire loom receiving portion and a flange connected to the wire loom receiving formation, the flange having a bore defined therethrough,
wherein the bore of the flange is engaged by one of the first mating formation and second mating formation and the first mating formation and the second mating formation are engaged via a snap-fit to secure the flange of the conduit harness between the first and second parts such that the conduit harness is offset from the aircraft component,
wherein the first mating formation and the second mating formation form a snap-fit connection engageable in a first snap-fit position and a second snap-fit position in the direction of engagement, and wherein in the first snap-fit position the first mating formation and the second mating formation are engaged to provide a recess of the first width therebetween, and,
in the second snap-fit position the first mating formation and the second mating formation are engaged to provide a recess of a second width therebetween,
wherein the second width is greater than the first width.

3. An aircraft conduit harness retention system according to claim 2 in which one of the first mating formation and the second mating formation comprises a pair of similar, spaced mating formations each engageable by the other of the first mating formation and the second mating formation.

\* \* \* \* \*